United States Patent
Kao et al.

(10) Patent No.: US 10,649,683 B2
(45) Date of Patent: May 12, 2020

(54) SYSTEM FOR MONITORING AND REPORTING AIRCRAFT DATA STORAGE STATUS

(71) Applicant: Panasonic Avionics Corporation, Lake Forest, CA (US)

(72) Inventors: Chiayu Kao, Lake Forest, CA (US); Christopher Do, Annandale, VA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 63 days.

(21) Appl. No.: 15/345,115

(22) Filed: Nov. 7, 2016

(65) Prior Publication Data
US 2018/0129447 A1    May 10, 2018

(51) Int. Cl.
G06F 12/00    (2006.01)
B64F 5/60    (2017.01)
G06F 3/06    (2006.01)

(52) U.S. Cl.
CPC .......... *G06F 3/0653* (2013.01); *G06F 3/0604* (2013.01); *G06F 3/067* (2013.01); *G06F 3/0685* (2013.01); *B64F 5/60* (2017.01)

(58) Field of Classification Search
CPC .... G06F 3/0653; G06F 3/0685; G06F 3/0604; G06F 3/067; B64F 5/60
See application file for complete search history.

(56) References Cited

U.S. PATENT DOCUMENTS

| | | | | |
|---|---|---|---|---|
| 5,848,367 | A * | 12/1998 | Lotocky | G06F 11/1417 701/36 |
| 7,506,040 | B1 * | 3/2009 | Rabe | H04L 43/0817 709/216 |
| 2004/0078123 | A1 * | 4/2004 | Igloi | B64F 5/60 701/31.4 |
| 2006/0100997 | A1 * | 5/2006 | Wall | G06F 12/0875 |
| 2010/0106852 | A1 | 4/2010 | Kindig et al. | |
| 2013/0232179 | A1 | 9/2013 | Chhaunker et al. | |
| 2015/0382027 | A1 | 12/2015 | Margis et al. | |
| 2016/0196457 | A1 * | 7/2016 | Mylaraswamy | H04W 4/80 340/10.1 |
| 2016/0248831 | A1 | 8/2016 | Watson et al. | |

* cited by examiner

*Primary Examiner* — Kalpit Parikh
(74) *Attorney, Agent, or Firm* — Stetina Brunda Garred & Brucker

(57) ABSTRACT

A system for monitoring and reporting data storage status of one or more line replaceable units installed in an aircraft. A data storage monitor onboard the vehicle is in communication with each of the line replaceable units. A storage status is reported, and a storage status log is generated for each line replaceable unit. The storage status logs are communicated to a base station over a communication link established between the base station and the data storage monitor for storage within a repository. The base station has a status log aggregator that generates a report from the storage status logs, an interface for an external management application to access the storage status logs, and an alarm that generates notifications to a predefined destination based upon an evaluation of the storage status logs against one or more alert rules.

20 Claims, 4 Drawing Sheets

SYSTEM FOR MONITORING AND REPORTING AIRCRAFT DATA STORAGE STATUS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to in-vehicle data communications systems, and more particularly, to systems for monitoring and reporting storage status for data on aircraft in-flight entertainment systems.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Many passengers bring their own personal electronic devices such as smart phones, media players, electronic readers, tablets, laptop computers, and so forth, for the express purpose of keeping occupied, but airlines also accommodate its customers with in-flight entertainment (IFE) systems. Although the specific installation may vary depending on the service class, each passenger seat is equipped with a display device, an audio output modality, an input modality such as a remote control, and a terminal unit. Generally, the terminal unit may generate video and audio signals, receive inputs from the remote control, and execute pre-programmed instructions in response thereto. The display device is typically an LCD screen that is installed on the seatback of the row in front of the passenger, though in some cases it may be mounted to a bulkhead or retractable arm or the like that is in turn mounted to the passenger's seat. Furthermore, the audio output modality is a headphone jack, to which a headphone, either supplied by the airline or by the passenger, may be connected.

Via the display and the audio outputs, a wide variety of multimedia content can be presented to the passenger. Recently released movies are a popular viewing choice, as are television shows such as news programs, situation and stand-up comedies, documentaries, and so on. Useful information about the destination such as airport disembarking procedures, immigration and custom procedures and the like is also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger using the remote control, which may also have alternative uses, namely, for navigating through the vast multimedia content library and making selections thereof for viewing and/or listening. Thus, the terminal unit may also include a content selection application with a graphical user interface, through which such navigation of the multimedia content library is possible. The foregoing types of programming that can be presented to the passenger via the in-flight entertainment system will henceforth be generally referred to as multimedia content.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. Accordingly, the multimedia content stored onboard the aircraft can range in the hundreds of gigabytes, if not over a terabyte. The majority of the data comprises the video programming, although the audio and video game content may be significant as well. This data is often not stored on each individual terminal unit, but rather, in a central content server also onboard the aircraft. In this regard, the terminal unit is understood to incorporate networking modalities such as Ethernet to establish data communications with the central content server. Once a particular selection of multimedia content is requested by the passenger via the content selection application, the terminal unit may retrieve the same from the central content server, decode the data, and present it to the passenger. Some systems may rely on terminal units storing data, with content distributed over groups of terminal units and data communicated from one terminal unit if a terminal unit not have requested content and it is available from another terminal unit.

As important as variety and selection may be in regards to the multimedia content, novelty is as important for airlines to keep its passengers engaged with the in-flight entertainment system, particularly for valuable frequent fliers. Thus, the multimedia content stored on the aircraft must be frequently updated. Due to the large quantity of data involved, normally a portable content loader is physically carried onboard while the aircraft is on the ground, and connected to a central server or repository. The portable content loader is generally comprised of a hard disk drive, an optical drive, or a solid state drive loaded with the update data. A download process is then initiated, and once complete, the portable content loader is disconnected and removed from the aircraft.

Since data storage space on the aircraft is not unlimited, older multimedia content must be removed from time to time to make space available for new, updated multimedia content. Time in between flights where data can be uploaded to and removed from the content server is limited, and it is desired to have a largely automated procedure that requiring little involvement on the part of a service technician. Furthermore, newer devices being installed in aircraft cabins such as interactive seat back displays and so forth also have data storage (and hence upload and deletion) requirements. Updates to content, media, software, and other types of data may be limited depending on the availability of space therefor, thereby limiting its functionality.

Thus, there is a need in the art for updated information regarding the amount of storage available and the amount of storage used across all such line replaceable units (LRUs).

In particular, it would be desirous to help airlines and content service providers manage the transfer of data, and ensure that the various line replaceable units with storage capability onboard the aircraft has sufficient space for the delivery of new data.

BRIEF SUMMARY

The present disclosure contemplates various systems and apparatuses for the management of uploading data to, and removing data from line replaceable units of vehicles, including aircraft. To this end, the systems and apparatuses may monitor and report data storage status relating to the line replaceable units. One embodiment includes a data storage monitor deployed to the aircraft, as well as a ground-side base station that communicates with the data storage monitor to retrieve the data storage status.

An embodiment of the present disclosure is directed to a system for monitoring and reporting data storage status of one or more line replaceable units installed in a vehicle. Each line replaceable unit may include a data storage device and defined by a total capacity and a current occupied space that is updated in response to data loading, data production, and data removal operations. The system may include a data storage monitor onboard the vehicle and in communication with each of the one or more line replaceable units. A storage status may be reported to the data storage monitor from the line replaceable units. Further, a storage status log may be generated by the data storage monitor for each line replaceable unit based upon the storage status reported therefrom. The system may also include a base station that is connectible to the data storage monitor. The storage status logs may be transmitted to the base station over a communication link established between the base station and the data storage monitor for storage within a repository. The base station may also include a status log aggregator that generates a report from one or more of the storage status logs. There may also be an interface for an external management application to access the storage status logs. The base station may also include an alarm that communicates notifications to a predefined destination based upon an evaluation of the storage status logs against one or more alert rules.

Another embodiment of the present disclosure is directed to an apparatus for monitoring and reporting data storage status of one or more line replaceable units installed in an aircraft, each of which include a data storage device. The apparatus may include a status retrieval interface that is connectible to the one or more line replaceable units. Each line replaceable unit may generate a storage status in response to a data operation thereon. The storage status may include total capacity and a current occupied space separately delineated according to constituent data types. The apparatus may further include a status database that is connected to the status retrieval interface. The storage statuses from each of the one or more line replaceable units may be recorded in the status database in conjunction with a timestamp. There may also be a status aggregator that is connected to the status database. A status report may be generated from one or more storage statuses from the line replaceable units, and includes an aircraft identifier and a line replaceable unit identifier. The apparatus may further include a ground side system interface connectible to a base station. The status report including each of the storage statuses recorded in the status database may be downloadable to the base station.

Yet another embodiment of the present disclosure is directed to an apparatus for monitoring and reporting data storage status of one or more line replaceable units installed in an aircraft, each of which includes a data storage device. The apparatus may include an air side system interface connectible to a data storage monitor that is installed on the aircraft, and collects storage statuses from the one or more line replaceable units. The storage statuses may include total capacity and a current occupied space separately delineated according to constituent data types. The apparatus may also include a storage status database connected to the download interface. The storage statuses retrieved from the data storage monitor may be recorded in the storage status database. There may also be an application interface that is connectible to an external management application. The storage status logs from the storage status database may be retrievable by the external management application through the application interface. The apparatus may also include an alarm that communicates notifications to a predefined destination based upon an evaluation of the storage status logs against one or more alert rules.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of systems and apparatuses for monitoring and reporting data storage status of line replaceable units installed in aircraft and other vehicles. This description is not intended to represent the only form in which the embodiments of the disclosed invention may be developed or utilized. The description sets forth the functions and features in connection with the illustrated embodiments, which are contemplated to support managing the upload and removal of data from the aircraft. It is to be understood that the same or equivalent functions may be accomplished by different embodiments that are also intended to be encompassed within the scope of the present disclosure. It is further understood that the use of relational terms such as first and second, local and remote, and the like are used solely to distinguish one from another entity without necessarily requiring or implying any actual such relationship or order between such entities.

Figure 1:
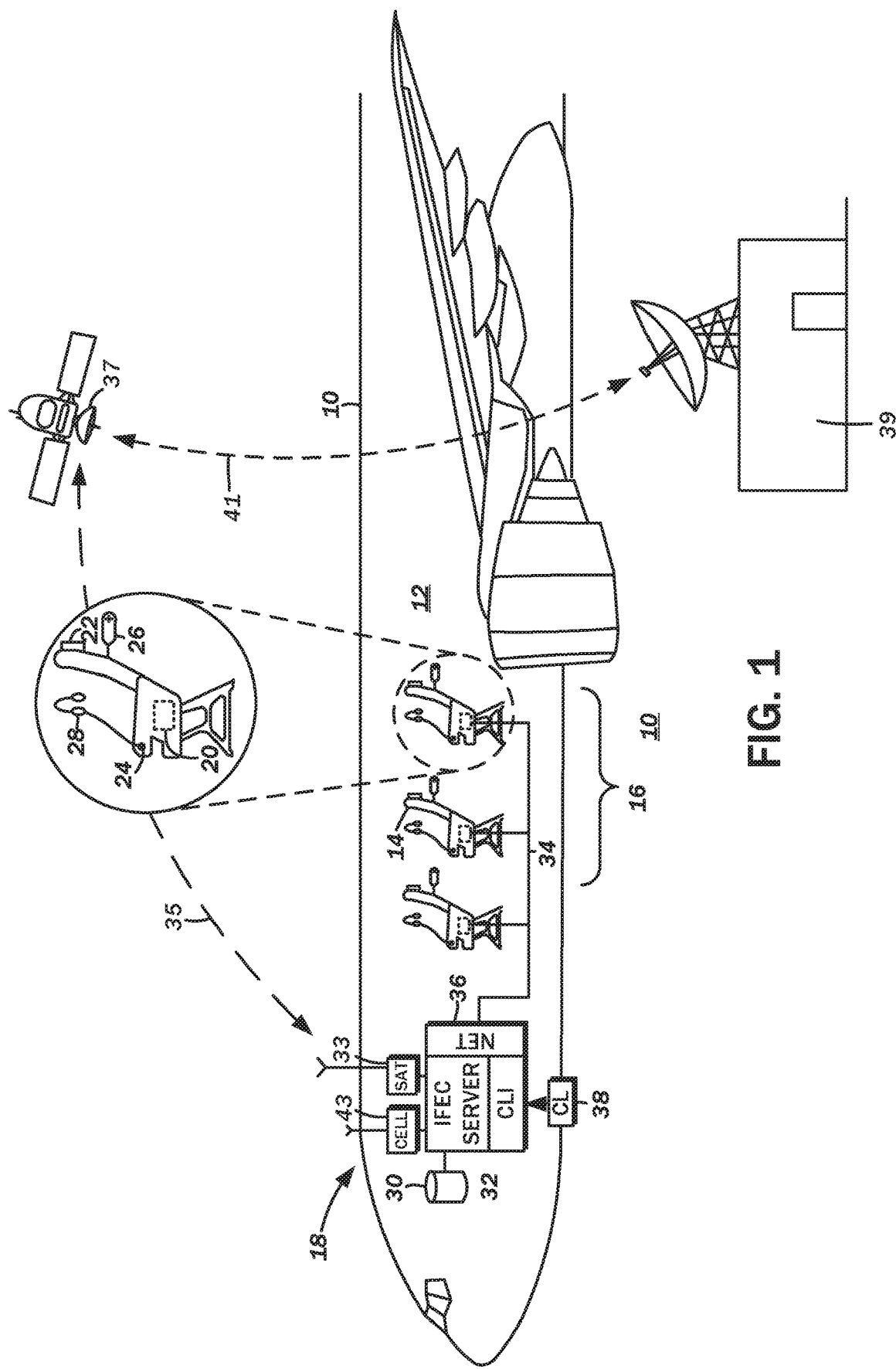
FIG. 1 is a diagram illustrating an aircraft in which the presently disclosed system for the monitoring and reporting of aircraft data storage status may be implemented.

The diagram of FIG. 1 depicts an exemplary aircraft 10 in which various embodiments of the presently disclosed wireless content loader may be implemented. Within a fuselage 12 of the aircraft 10 there are seats 14 arranged over multiple rows 16, and each seat 14 accommodating a single passenger. Although the features of the present disclosure will be described in the context of the passenger aircraft 10 and amenities therefor, other passenger vehicles such as trains, watercraft, buses, and others utilizing integrated entertainment systems may be substituted.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. This is by way of example only, and other display 22 and remote controller 26 mounting and access configurations such as a retractable arm or the like mounted to an armrest of the seat 14, mounting on a bulkhead, or an integrated terminal unit and 20 and display 22, e.g., a smart monitor (described below).

The display 22 is understood to be a conventional liquid crystal display (LCD) screen with a low profile that is suitable for installation on the seatback. Each passenger can utilize an individual headset 28, supplied by either the airline or by the passenger, for audio as external speakers are typically not provided. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including three sockets or a standard audio output without noise canceling. In alternate embodiments, each display 22 may incorporate be integrated with a terminal unit 20 to form a display unit referred to in the art as a smart monitor.

A common use for the terminal unit 20 installed on the aircraft is the playback of various multimedia content. The terminal unit 20 may be implemented with a general-purpose data processor that decodes the data files corresponding to the multimedia content and generates video and audio signals for the display 22 and the audio output 24, respectively. This multimedia content may include movies, television shows, such as news programs, comedy, documentaries, and informational content pertinent to the flight destination. Furthermore, multimedia content may also encompass audio-only programming, as well as interactive games, flight progress mapping, flight status displays, newspapers/magazines readable on the display 22, and so on. Broadly, multimedia content is intended to refer to any content of varying duration and form that can be presented to the passenger via the display 22 or the audio output 24, or a combination thereof.

The data files of the multimedia content may be stored in a database 30 associated with the IFEC system 18. Specifically, the database 30 and is connected to and managed by an IFEC server 32, which may be a specifically adapted general purpose computer system configured as a server to provide data in response to requests therefor. Various software modules are understood to be incorporated into the IFEC server 32, including a streaming server that retrieves the multimedia content from the database, as well as a cataloging/menu application with which the user interacts to select the desired multimedia content.

The passenger can play games being executed on the terminal unit and otherwise interact with the multimedia content with the remote controller 26. Navigating through the vast multimedia content library and selecting ones for viewing and/or listening is also possible with the remote controller 26, though in some embodiments, a touch-screen display may be provided for a more intuitive interaction with the multimedia content library. In either case, the terminal unit 20 is loaded with a content selection software application that is executed by the data processor and accepts input from the remote controller 26 or other input modality and generates a response on the graphical interface presented on the display 22.

Each of the terminal units 20 may be connected to the IFEC server 32 over an aircraft local area network 34, one segment of which may preferably be Ethernet. Thus, the IFEC server 32 includes a data communications module 36, which may be an Ethernet data communications module. Wireless local area networks may also be established within the cabin for personal electronic devices such as smart phones, tablets, laptop computers and the like to connect to the IFEC server 32, or to a satellite Internet connection, the details of which have been omitted for the sake of brevity.

The IFEC server 32, as well as the other avionics systems onboard the aircraft 10, may communicate with remote nodes via a variety of communications modalities. The IFEC system 18 may include a satellite module 33 that establishes a data uplink 35 to a communications satellite 37. The data uplink 35 may be Ku-band microwave transmissions. However, any suitable communications satellite 37, such as Inmarsat or Iridium may also be utilized without departing from the present disclosure. The data transmitted to the communications satellite 37 is relayed to a satellite communications ground station 39. A data downlink 41 is established between the communications satellite 37 and the satellite communications ground station 39. Alternatively, or additionally, the aircraft 10 can be equipped with a cellular modem 43 for remote connectivity, which similarly establishes a communications link via terrestrial cellular sites in accordance with modalities well known in the art.

The multimedia content stored on the database 30 is periodically updated, and one modality by which this may be achieved is a content loader 38 that is connected to the IFEC server 32 in between flights while the aircraft 10 is on the ground. To this end, the IFEC server 32 includes a content loader interface 40 that physically and communicatively links the content loader 38 to the IFEC server 32. The content loader 38 is understood to include a data storage device such as a hard disk drive or a solid state drive, to which the multimedia content is loaded from a content source. Rather than physically connecting the content loader 38 to the IFEC system 18 with cables and the like, it is possible for the content loader 38 to be connected wirelessly, through an onboard Wi-Fi network, cellular network, or a satellite communication link.

It will be appreciated that multimedia content is not the only data can be updated from the content loader 38, and other content, software, and temporary files may also be loaded on to the content loader 38 for transfer to the IFEC system 18. Furthermore, the database 30 and the IFEC server 32 are also not the only devices installed within the aircraft 10 that may be updated with new data such as multimedia content, software, etc. In some embodiments, software or content stored on the terminal unit 20 may also be updated. Each of the components installed on the aircraft 10 may also be referred to as line replaceable units (LRUs), and the present disclosure contemplates the monitoring and reporting of the data storage statuses thereof.

The disclosed arrangement of the IFEC system 18, along with its constituent components, are presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

Figure 2:
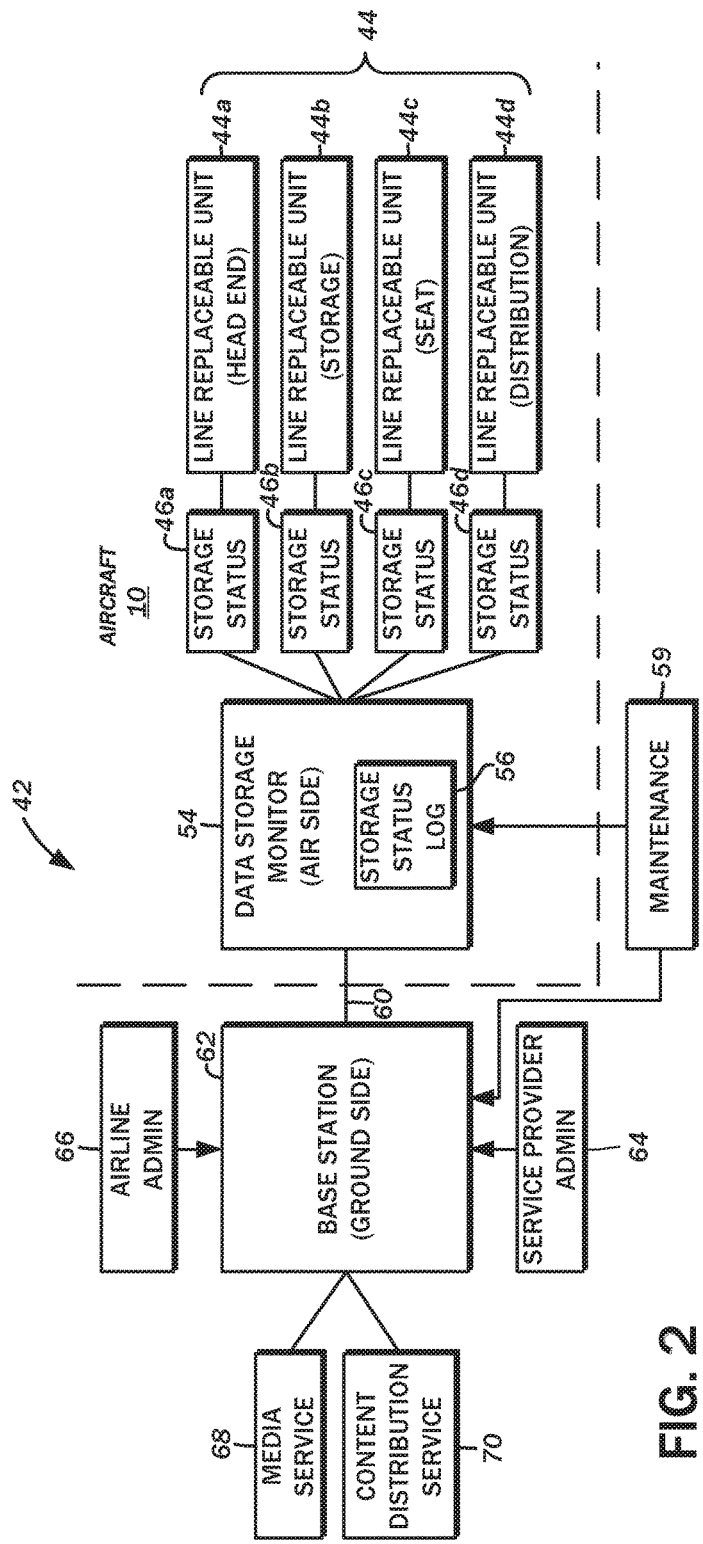
FIG. 2 is a block diagram of the system for monitoring and reporting aircraft data storage status according to one embodiment.

With reference to the block diagram of FIG. 2, a system 42 for monitoring and reporting data storage status is envisioned to address the need for the efficient and effective management of the storage in the line replaceable units. As storage capacity of the line replaceable units is not unlimited, those tasked with loading data on to the aircraft 10 is to be provided information regarding available space in accordance with the present disclosure. Thus, it is possible for appropriate steps to be taken to remove old data before uploading new data.

As indicated above, the aircraft 10 has installed therein various line replaceable units 44. For example, there is a first line replaceable unit 44a, which may be referred to as a head end, e.g., the IFEC server 32 that functions as a central source of data/functionality of the IFEC system 18. There may also be a second line replaceable unit 44b, which may be the aforementioned database 30. Again, each of the terminal units 20 for the seats 14 may have various data storage capabilities, and are also deemed to be line replaceable units 44, in particular, a third line replaceable unit 44c. There is also a fourth line replaceable unit 44d, which may be an onboard content distribution service. It will be appreciated that the illustrated line replaceable units 44 are exemplary only and not intended to be limiting. The aircraft 10 may include additional line replaceable units 44 that is capable of storing data, and may therefore be utilized by the system 42.

Figure 3:
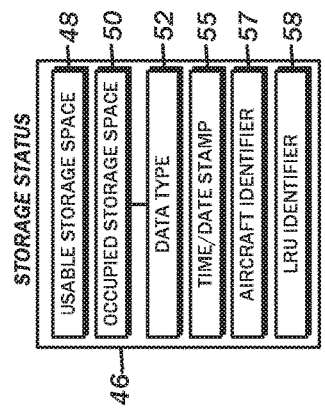
FIG. 3 is a diagram illustrating the exemplary elements of a data storage status.

Each of the line replaceable units 44 generate a storage status 46. That is, the first line replaceable unit 44a generates a first storage status 46a, the second line replaceable unit 44b generates a second storage status 46b, the third line replaceable unit 44c generates a third storage status 46c, and the fourth line replaceable unit 44d generates a fourth storage status 46d. According to an embodiment shown in FIG. 3, the storage status 46 is defined by a usable storage space value 48 and an occupied storage space value 50. Both the usable storage space value 48 and the occupied storage space value 50 may be provided in the number of bytes. The usable storage space value 48 is understood to be the maximum number of bytes allowed for storage in the particular line replaceable unit 44. The occupied storage space value 50 is the number of bytes already recorded with data in the particular line replaceable unit 44. The storage status 46 is generated for any line replaceable unit 44 with physical storage and thus allows data to be retained therein and retrieved therefrom.

Various types of data are contemplated to be stored in the line replaceable units 44, and so the storage status 46 is understood to detail the occupied space for each. In accordance with various embodiments, the data types may include media, content, software, and temporary files. However, this listing is not exhaustive, and the data stored on the line replaceable unit 44 may have any other classification applied thereto. Each line replaceable unit 44 may have a varying mix of different data types; for instance, the first line replaceable unit 44a (head end) may store all of media, content, software, and temporary files, while the third line replaceable unit 44c (seat) may store software and content but not media.

The storage status 46 may include a data type value 52. Those having ordinary skill in the art will recognize that the structure of the storage status 46, particularly as it relates the association between the occupied storage space value 50 and the data type value 52, may vary depending on the implementation. For example, there may be a single value for the total occupied storage space, with additional data reporting the breakdown of the various data types. Alternatively, there may be multiple occupied storage space values 50, each with an associated data type value 52.

The line replaceable units 44 are each connected to a data storage monitor 54 and in communication therewith. It is understood that the data storage monitor 54 is installed in the aircraft 10, and may be a separate data processing apparatus or hardware device with data communication capabilities and pre-programmed with instructions that correspond to the functions ascribed to the data storage monitor 54 as disclosed herein. In some embodiments, the data storage monitor 54 may also be referred to as the airside component, because of its installation within the aircraft 10.

The storage status 46 may be updated by the line replaceable unit 44 when there is a data operation, e.g., a data loading, data production, or data removal operations with respect to the line replaceable unit 44. An aggregated storage status log 56 comprised of each of the storage statuses 46 from the line replaceable units 44 is generated by the data storage monitor 54. The storage status 46 is understood to represent the storage usage at a particular instant in time, so it includes a timestamp 55. As referenced herein, the timestamp 55 is intended to encompass both time stamp and the date stamp, in whichever preferred format.

The storage status log 56 may also include an identifier 57 of the aircraft 10 from which it was generated. The aircraft tail number is typically used for this purpose. Additionally, the storage status log 56 includes an identifier for the particular line replaceable unit 44 to which that particular storage status pertains. The storage status 46 may thus include a line replaceable unit identifier 58. Both the aircraft identifier 57 and the line replaceable unit identifier 58 are optional, as the data storage monitor may classify each received storage status 46 upon receipt from the particular line replaceable unit 44 and the aircraft 10.

Those having ordinary skill in the art will recognize that a variety of data collection modalities may be utilized to obtain the storage status 46. For instance, the data storage monitor 54 may periodically poll each of the line replaceable units 44 for the most updated storage status 46 therefrom. This polling may be in the form of a storage status inquiry that is periodically generated by the data storage monitor 54 and transmitted to each of the line replaceable units 44, to which the line replaceable units 44 respond. Alternatively, the line replaceable unit 44 may generate a message to the data storage monitor 54 in response to an update to the storage status 46 resulting from the data operation.

With the storage statuses 46 collected and the storage status log 56 generated, the data storage monitor 54 establishes a communication link 60 to a base station 62, also referred to as a ground side component. In one contemplated embodiment, the communication link 60 may be wireless, though in other embodiments, a manual wired link may be established. This operation may be performed by a maintenance or service technician 59 that physically boards the aircraft 10 at the conclusion of its flight to retrieve the storage statuses 46 and the storage status log 56 from the data storage monitor 54 for loading on to the base station 62.

The storage statuses 46 is understood to be recorded in the base station 62, which may generate various reports therefrom. As will be described in further detail below, such reports may be retrieved via an end-user application running on a general-purpose computer that interfaces with the base station 62. The application is understood to have a separate user interface for accessing the storage status log 56 saved on the base station 62. There are other embodiments, however, where the base station 62 includes a direct terminal and user interface from which the storage statuses 46 and the storage status log 56 may be accessed.

The aircraft data storage status may be useful to a variety of entities within the flight operations environment. Specifically, there is an administrator 64 for a service provider, e.g., the entity responsible for the setup and configuration of the system 42 that maintains the various user accounts established for accessing the storage status log 56. There may also be an administrator 66 for the airline. Those entities responsible for providing multimedia content may also utilize the storage status log 56 to better manage the data upload/deletion process from the line replaceable units 44, including a media service 68 and a content distribution service 70.

Although these entities may manually access the storage status log 56 on an as-needed basis, the present disclosure also contemplates the base station 62 generating alerts when certain conditions are met, such as when usage is over a threshold percentage of the total capacity. These notifications may be generated through the aforementioned administrative interface, whether through a separate application or directly with a terminal of the base station 62. Other embodiments contemplate e-mail notifications that are sent to select users. These features are intended to help airlines and content service providers manage the transfer of data, and ensure that there is sufficient storage onboard the aircraft 10 to deliver new content.

Figure 4:
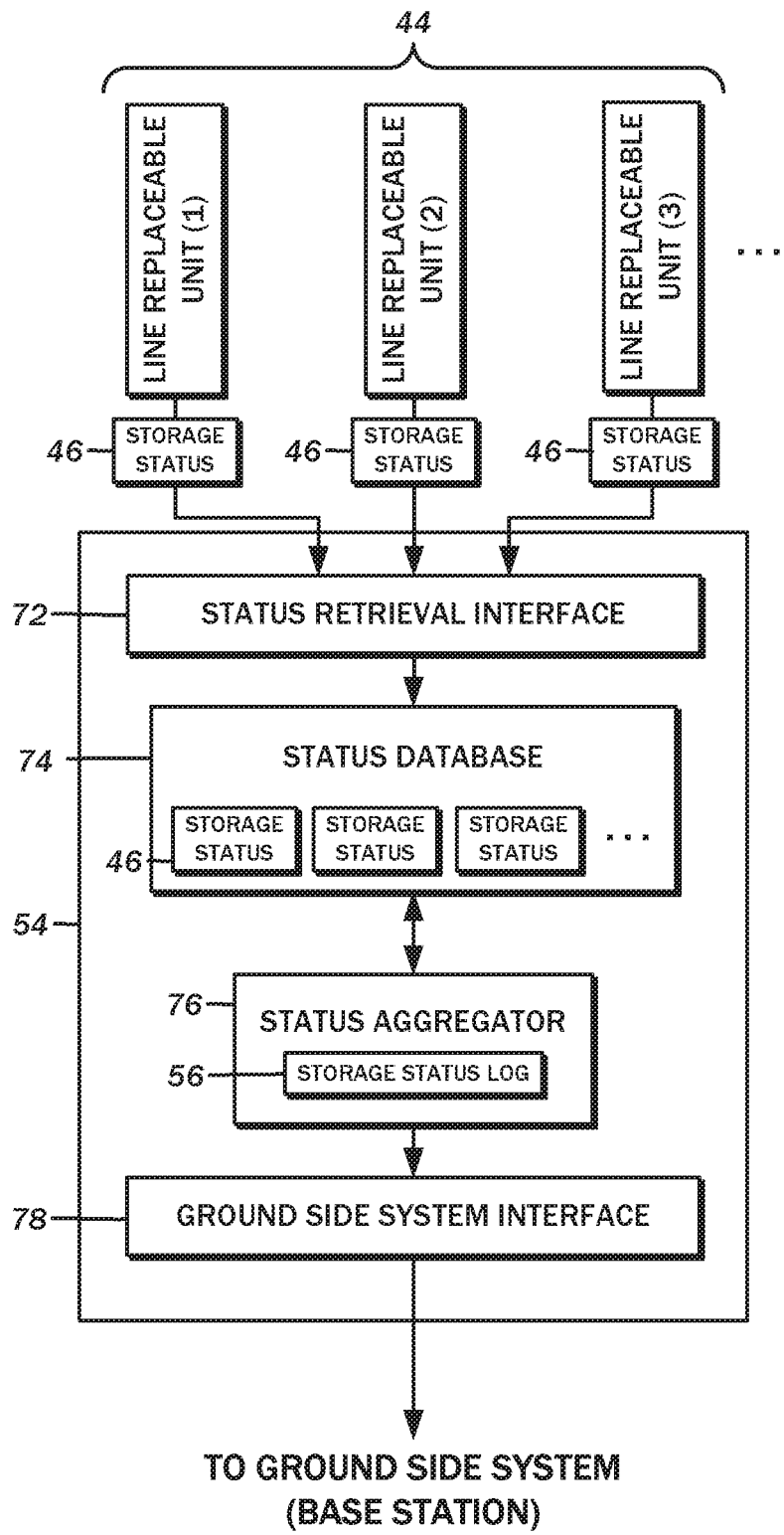
FIG. 4 is a block diagram of an air-side embodiment of an apparatus for monitoring and reporting data storage status.

Referring now to FIG. 4, additional details of the data storage monitor 54, that is, the air side component, will be described. Again, multiple line replaceable units 44 are connected to the data storage monitor 54, specifically via a status retrieval interface 72. According to various embodiments, the status retrieval interface 72 implements the physical and logical interface between the line replaceable units 44 and the data storage monitor. As indicated above, each line replaceable unit 44 provides a storage status 46, which includes the line replaceable unit identifier 58, the usable storage space value 48, and the occupied storage space value 50. To the extent any line replaceable unit 44 includes multiple storage partitions spanning one or more physical drives, the usable storage space value 48 may be provided for each partition. In some implementations, one physical drive may be dedicated for operational software (e.g., Secure Digital High Capacity—SDHC cards), while another physical drive may be dedicated for media data and/or content data (e.g., solid state drives—SSDs).

The occupied storage space value 50 is delineated or broken down according to the constituent data types noted earlier, including multimedia data, content data, software data, and temporary files. For example, the storage status 46 may indicate x number of bytes for multimedia data, y number of bytes for software data, and so forth. As utilized herein, temporary files is understood to refer to the files that are preserved between system reboots.

The occupied storage space value 50 of the storage status 46 is updated at the completion of any data operation. One type of data operation is a data loading event, including foreground or background loading with the content loader 38, light media loading using a universal serial bus or other portable disk drive, as well as wireless data loading via satellite, Wi-Fi or cellular modalities. If the data operation is interrupted before completion due to a loading error, connectivity loss, or other like reasons, the size of the partially loaded data is reflected in the occupied storage space value 50. Another data operation also includes a data installation event, such as when updates to an executable software application, or uploads of digital certificates takes place. The storage status 46, and specifically the occupied storage space value 50, is also updated upon completion of installation and the data is activated for use. Yet another type of data operation is data production, which occurs when an avionics system or application generates data files or log files for subsequent transfer. Such data is understood to remain persistent in the storage device between power cycles. Again, the occupied storage space value 50 is updated when such new data is saved. Removal of data from the storage device of the line replaceable unit 44 also constitutes a data operation. The removal may occur as a result of an avionics system or application commands the removal of data from storage for cleanup.

Still referring to the block diagram of FIG. 4, the status retrieval interface 72 is connected to a status database 74, which stores each of the storage statuses 46 provided by the line replaceable units 44 for further processing, as will be described more fully below. The data storage monitor 54 may further include a status aggregator 76 that is connected to the status database 74 and retrieves each of the storage statuses 46 to generate the storage status log 56. According to one embodiment, the storage status log 56 is generated in response to a Weight on Wheel (WoW) event, e.g., when the aircraft 10 lands, if a new line replaceable unit 44 has been added, or if the storage status 46 of a particular line replaceable unit 44 has changed since the last time the storage status log 56 was generated. The storage status log 56 is understood to include the aircraft identifier, along with a timestamp (including the date) of when it was generated.

The data storage monitor 54 includes a ground side system interface 78 that is connectible to the base station 62. The generated storage status log 56, as well as the storage status logs 56 collected in the status database 74, are downloaded to the base station 62, and the ground side system interface 78 establishes the communications link by which this is achieved. Various communications modalities may be implemented by the ground side system interface 78, including wired and wireless types. For instance, the cellular modem 43 may be used, in which case the ground side system interface 78 includes a cellular module that controls the cellular modem 43 to establish the wireless data communications link over the cellular network to the base station 62. According to one embodiment, the cellular connection may be activated in response to the weight on wheels (WoW) event. Similarly, the satellite module 33 may also be used.

The storage status log 56 may be relayed to the base station 62 manually, via a maintenance interface. An external storage device is connected the data storage monitor 54, which is then physically taken to the base station 62 and connected thereto. The downloaded storage status log 56 is retained in the data storage monitor 54 until receipt of a confirmation that a successful transfer to the base station 62 has been completed. Optionally, the storage status log 56 may be retained for fifty flight legs, though this is by way of example only and not of limitation. Any other suitable lifespan for the storage status log 56 to reside on the data storage monitor 54 may be substituted. The older storage status logs 56 may be sequentially deleted as new storage status logs 56 are generated, once the archive limit has been reached.

In some embodiments of the present disclosure, the data storage monitor 54 may be separate from the content loader interface 40 that is used to connect the content loader 38 and load new content. However, as weight allowance and space onboard the aircraft 10 is at a premium, the data storage monitor 54 may be integrated with the content loader interface 40. In such embodiments, the maintenance interface may provide additional information once the content loader 38 is connected. More particularly, the most recent storage status 46 for the target line replaceable unit 44 may be presented, including the line replaceable unit identifier 58, the timestamp 55 of when the storage status 46 was recorded, the usable storage space value 48, and the occupied storage space value 50. Additionally, upon selection of all of the data to be loaded from the content loader 38, the maintenance interface can indicate whether the operation will complete, or not be completed due to insufficient storage space. Content loaders 38 that connect via a wireless link may likewise provide a warning when there is insufficient storage space.

Figure 5:
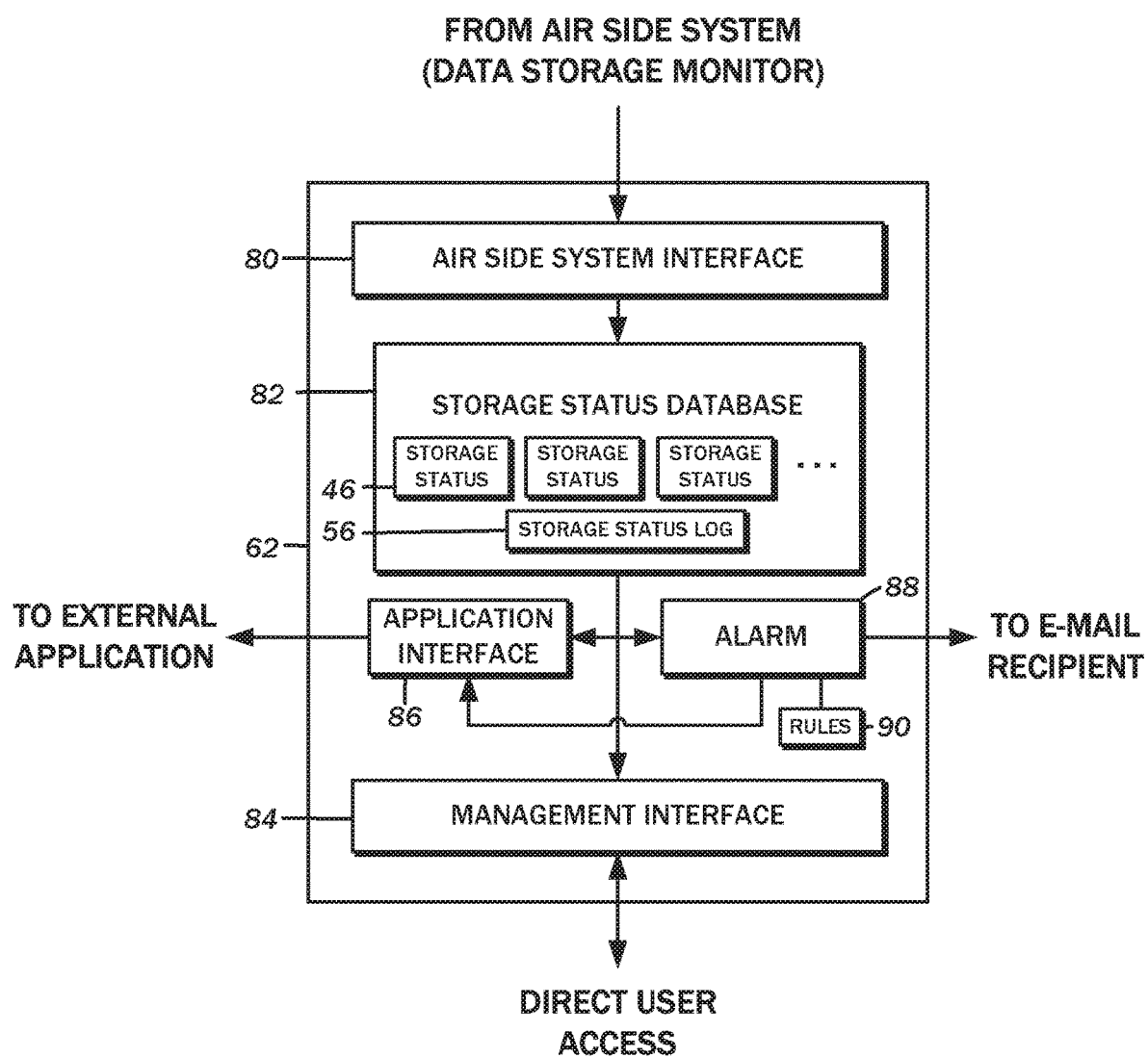
FIG. 5 is a block diagram of a ground-side embodiment of the apparatus for monitoring and reporting data storage status.

The block diagram of FIG. 5 shows additional details of the base station 62. There is an air side system interface 80 that is the counterpart to the aforementioned ground side system interface 78, and connects to the same, over a wired connection or a wireless connection as discussed above. The air side system interface 80 receives the storage status log 56 and/or the storage statuses 46, and are saved to a storage status database 82. The base station 62 includes a variety of interfaces to the data in the storage status database 82, including a management interface 84, an application interface 86 connects to external/remote applications, and an alarm 88 that generates and sends/communicates notifications when certain conditions are met.

The management interface 84 is understood to permit direct access to the storage status database 82. By way of example, storage status logs 56 from a plurality of aircraft 10 in a fleet may be stored on the base station 62, and a hierarchical menu system may be provided that first requests the selection of a particular aircraft. Once the aircraft 10 is selected, there may be an additional selection of one or more line replaceable units 44 for which the storage status logs 56 are to be accessed. Within each line replaceable unit 44, there may be multiple partitions and multiple physical and logical volumes, so each of these may be selectable to obtain storage statuses 46. By default, the most recent storage status log 56 for the selected line replaceable unit 44 is presented, though this is by way of example only and not of limitation.

Historical data may also be viewed, so there may be an input element by which a time period for viewing may be selected. The individual storage status logs 56 from different times may be retrieved for presentation, and structured according to the data type (media, content, software, temporary files).

The typical aircraft 10 may have numerous line replaceable units 44 with data storage capabilities, so it is contemplated that multiple line replaceable units 44 can be treated and viewed as a group. One application for this feature is to view the seatback unit line replaceable unit 44c. There may potentially be hundreds of identically configured terminals/line replaceable units 44, and so it is possible to group these by model, cabin class, and so forth. When viewing the storage status logs 56 as a group, the management interface 84 may additionally show and highlight the maximum, minimum, and mean value for each of the total capacity and the current occupied space for each data type.

Still referring to the block diagram of FIG. 5, the application interface 86 may be used to connect external or remote applications to the base station 62, and present the storage status logs 56 in the manner discussed above. The most current aircraft storage status can be provided to applications that are used for preparing data packages, following their respective workflow procedures. Access to the base station 62 through the application interface 86 may be restricted, and only permitted after validating with a username/password combination or the like.

The storage status logs 56 downloaded to the base station 62 may be utilized for planning data uploads to the various line replaceable units 44, and so may be queried when performing administrative tasks. The present system 42 also contemplates the generating of notifications when various over-capacity, or near over-capacity conditions materialize. The base station 62 therefore includes the alarm 88, which monitors the data in the storage status database 82 and notifies designated message subscribers either upon logging in through the management interface 84 or the application interface 86, or via e-mail, i.e., the alarm generates and communicates notifications in accordance with contact information for the message subscribers. Once the notification is generated, a requirement to acknowledge the notification may be enforced.

The conditions under which the notifications are generated may be defined in a set of rules 90. For instance, the notification may be generated when the occupied space for multimedia content is greater than a predefined size. Further, there may be another rule that generates the notification when the occupied space overall is greater than a predefined percentage of the usable storage space value 48. Still another rule may be to generate the notification when the occupied storage space value 50 of a group of line replaceable units 44 is more than a predefined percentage of the usable storage space value 48. Beyond these storage status-based rules, notifications based on other tracked conditions are possible. One contemplated notification is generated when a storage status log 56 has not been received from a given aircraft 10 for over fourteen days, or any other specified time period. The foregoing rules 90 are presented by way of example only and not of limitation. Those having ordinary skill in the art will readily recognize other possible rules that may be set, depending on the particular needs of the administrator.

The particulars shown herein are by way of example only for purposes of illustrative discussion, and are presented in the cause of providing what is believed to be the most useful and readily understood description of the principles and conceptual aspects of the various embodiments of the systems for monitoring and reporting data storage status of line replaceable units installed in aircraft and other vehicles. In this regard, no attempt is made to show any more detail than is necessary for a fundamental understanding of the different features of the various embodiments, the description taken with the drawings making apparent to those skilled in the art how these may be implemented in practice.

What is claimed is:

1. A system for monitoring and reporting data storage status of one or more line replaceable units installed in a vehicle, each line replaceable unit including a data storage device and defined by a total capacity and a current occupied space updated in response to data loading, data production, and data removal operations, the system comprising:

a data storage monitor onboard the vehicle and in communication with each of the one or more line replaceable units, a storage status updated after completion of a data operation on a respective one of the one or more line replaceable units being reported to the data storage monitor from the line replaceable units and a storage status log being generated by the data storage monitor for each line replaceable unit based upon the storage status reported therefrom in response to an externally triggered vehicle status change event independent of the data operation; and a base station independent of the data storage monitor and periodically connectible to the data storage monitor between vehicle trips, the storage status logs being transmitted to the base station over a communication link established temporarily between the base station and the data storage monitor for storage within a repository during a limited time duration between the vehicle trips, the base station including a status log aggregator that generates a report from one or more of the storage status logs, an interface for an external management application to access the storage status logs, and an alarm that generates notifications to a predefined destination based upon an evaluation of the storage status logs against one or more alert rules.

2. The system of claim 1, wherein the storage status includes the current occupied space on the data storage device of the line replaceable unit pertaining thereto.

3. The system of claim 2, wherein the storage status further includes the total capacity of the data storage device of the line replaceable unit pertaining thereto.

4. The system of claim 3, wherein the current occupied space is further delineated according to data type, the data type being selected from a group consisting of media, content, software, and temporary files.

5. The system of claim 1, wherein the storage status includes a vehicle identifier corresponding to the vehicle and a line replaceable unit identifier corresponding to the line replaceable unit to which the storage status pertains.

6. The system of claim 1, wherein the storage status includes a date and time stamp corresponding to when any of the data loading, data production, or data removal operations occurred on the line replaceable unit to which the storage status pertains.

7. The system of claim 1, wherein the line replaceable units report the storage status to the data storage monitor upon the current occupied space being updated following any one of the data loading, data production, or data removal operations.

8. The system of claim 1, wherein the line replaceable units report the storage status to the data storage monitor in response to a storage status inquiry from the data storage monitor.

9. The system of claim 1, wherein the communication link from the data storage monitor to the base station is wireless.

10. The system of claim 1, wherein the communication link from the data storage monitor to the base station is wired.

11. The system of claim 1, wherein the notification is delivered as an electronic mail message.

12. The system of claim 1, wherein the notification is delivered as an interactive alert on a receiving computer system.

13. An apparatus for monitoring and reporting data storage status of one or more line replaceable units installed in an aircraft and each including a data storage device, the apparatus comprising:

a status retrieval interface connectible to the one or more line replaceable units, each generating a storage status in response to a data operation thereon, the storage status including total capacity, and a current occupied space separately delineated according to constituent data types;

a status database connected to the status retrieval interface, the storage statuses from each of the one or more line replaceable units being recorded therein in conjunction with a timestamp;

a status aggregator connected to the status database, a status report being generated from one or more storage statuses over one or more aircraft flights from the line replaceable units in response to an externally triggered aircraft status change event independent of the data operation and including an aircraft identifier and line replaceable unit identifiers; and a ground side system interface periodically connectible to a base station that is independent of the apparatus for monitoring and reporting data storage status, the status report including each of the storage statuses recorded in the status database being downloadable to the base station during a limited time duration between the aircraft flights over a temporary communication link.

14. The apparatus of claim 13, wherein the ground side system interface establishes a wireless communication link to the base station.

15. The apparatus of claim 13, wherein the data operation includes any one of:

data loading, data production, or data removal on the line replaceable unit.

16. The apparatus of claim 13, wherein the data type is selected from a group consisting of: media, content, software, and temporary files.

17. An apparatus for monitoring and reporting data storage status of one or more line replaceable units installed in an aircraft and each including a data storage device, the apparatus comprising:

an air side system interface connectible to a data storage monitor installed on the aircraft independent of the apparatus for monitoring and reporting data storage status and collects storage statuses updated after completion of a data operation over one or more aircraft flights from the one or more line replaceable units, the data storage status being reported to the data storage monitor in response to an externally triggered aircraft status change event independent of the data operation, storage statuses including total capacity and a current occupied space separately delineated according to constituent data types;

a storage status database connected to the air side system interface, the storage statuses retrieved from the data storage monitor being recorded therein;

an application interface periodically connectible to an external management application, the storage status logs from the storage status database being retrievable by the external management application through the application interface during a limited time duration between the aircraft flights over a temporary communication link; and an alarm that generates notifications to a predefined destination based upon an evaluation of the storage status logs against one or more alert rules.

18. The apparatus of claim 17, further comprising:

a storage status log aggregator connected to the storage status database, a report being generated by the status log aggregator from the storage statuses.

19. The apparatus of claim 17, wherein the notification is an electronic mail message.

20. The apparatus of claim 17, wherein the data type is selected from a group consisting of: media, content, software, and temporary files.

\* \* \* \* \*